(12) United States Patent
Jiao (10) Patent No.: US 11,448,855 B1
(45) Date of Patent: Sep. 20, 2022

(54) MULTI-FUNCTIONAL MIRROR (71) Applicant: Ce Jiao, Guangzhou (CN)

(72) Inventor: Ce Jiao, Guangzhou (CN)

( * ) Notice: Subject to any disclaimer, the term of this patent is extended or adjusted under 35 U.S.C. 154(b) by 0 days.

(21) Appl. No.: 17/670,512

(22) Filed: Feb. 14, 2022

(30) Foreign Application Priority Data

Jan. 21, 2022 (CN) .......................... 202220177462.0

(51) Int. Cl.
*G02B 7/182* (2021.01)
*F16M 11/20* (2006.01)
*F16M 11/14* (2006.01)
*F16M 11/28* (2006.01)

(52) U.S. Cl.
CPC .............. *G02B 7/182* (2013.01); *F16M 11/14* (2013.01); *F16M 11/2021* (2013.01); *F16M 11/28* (2013.01)

(58) Field of Classification Search
CPC .... G02B 7/182; F16M 11/14; F16M 11/2021; F16M 11/28
USPC ........ 248/466, 469, 474; 359/875, 865, 872, 359/878
See application file for complete search history.

(56) References Cited

U.S. PATENT DOCUMENTS

| 3,004,474 | A | * | 10/1961 | Hund | ...................... | A61B 1/247 |
| | | | | | | 359/875 |
| 6,027,219 | A | * | 2/2000 | Arambulo | .............. | A61B 1/227 |
| | | | | | | 359/872 |
| 6,619,955 | B2 | * | 9/2003 | Cardarelli | .............. | A61B 1/247 |
| | | | | | | 433/30 |
| 6,698,906 | B1 | * | 3/2004 | Tally | ........................ | G02B 5/08 |
| | | | | | | 359/876 |
| 6,955,437 | B1 | * | 10/2005 | Roberts | ..................... | B60D 1/36 |
| | | | | | | 359/872 |
| 7,080,913 | B2 | | 7/2006 | Henion et al. | | |
| 8,356,908 | B1 | * | 1/2013 | Zadro | ................... | F21V 33/004 |
| | | | | | | 362/135 |
| 8,651,862 | B2 | * | 2/2014 | Solomon | ................... | A61C 3/00 |
| | | | | | | 433/147 |
| 8,718,877 | B1 | | 5/2014 | Englander et al. | | |
| 9,290,128 | B2 | | 3/2016 | Pan | | |
| 2020/0064590 | A1 | * | 2/2020 | Boehm | ................... | F16M 11/14 |
| 2022/0086991 | A1 | * | 3/2022 | Park | ........................ | G06T 11/00 |

* cited by examiner

*Primary Examiner* — Todd M Epps
(74) *Attorney, Agent, or Firm* — True Shepherd LLC; Andrew C. Cheng (57) ABSTRACT

A multi-functional mirror, includes: a mirror part including a mirror surface and a housing for fixing the mirror surface; a connecting rod detachably connected to the housing and used to support the mirror part; and a base detachably connected to the connecting rod and used to fix and support the connecting rod, where the base has a holding portion for holding a smart terminal. The multi-functional mirror not only can be used as a mirror but also can be used as a support for a smart terminal, and is high in detachability and good in replaceability of each part and thus convenient to carry. The mirror can also be used as a mirror on an office table to view people behind, thereby preventing peeping, preventing viewing by workmates and boss and ensuring security in the office. The mirror can further be used as a cosmetic mirror.

11 Claims, 6 Drawing Sheets

MULTI-FUNCTIONAL MIRROR

CROSS-REFERENCE TO RELATED APPLICATIONS

This application claims priority to Chinese Patent Application No. 202220177462.0 with a filing date of Jan. 21, 2022. The content of the aforementioned application, including any intervening amendments thereto, is incorporated herein by reference.

TECHNICAL FIELD

The present disclosure relates to a mirror, and in particular, to a multi-functional mirror.

BACKGROUND ART

Mirrors, as daily necessities, can be seen everywhere in life, such as cosmetic mirrors and rear view mirrors. Nevertheless, existing mirrors generally have single functionality and are poor in detachability. Once the mirror is damaged, it cannot be replaced.

On the market, there is an urgent need for a mirror that can be placed on an office table to view people behind, thereby preventing peeping, preventing viewing by workmates and boss and ensuring security in the office, and it can also be used as a cosmetic mirror. It is best that such a mirror can be applied to different scenarios, for example, placed on a table or clamped on a wheelchair.

SUMMARY

The technical problem to be solved in an embodiment of the present disclosure is to, in view of the defects of single functionality and poor detachability of existing mirrors, provide a multi-functional mirror to enrich the functions of the mirror and enhance the detachability.

To solve the above technical problem, an embodiment of the present disclosure provides a multi-functional mirror including: a mirror part including a mirror surface and a housing for fixing the mirror surface; a connecting rod detachably connected to the housing and used to support the mirror part; and a base detachably connected to the connecting rod and used to fix and support the connecting rod, where the base has a holding portion for holding a smart terminal.

The implementation of the embodiment of the present disclosure has the following beneficial effects: the multi-functional mirror not only can be used as a mirror but also can be used as a support for a cellphone, and is high in detachability and good in replaceability of each part and thus convenient to carry.

BRIEF DESCRIPTION OF THE DRAWINGS

To describe the technical solutions in the embodiment of the present disclosure or in the prior art more clearly, the following briefly introduces the accompanying drawings required for describing the embodiment or the prior art. Apparently, the accompanying drawings in the following description show merely some embodiments of the present disclosure, and a person of ordinary skill in the art may still derive other drawings from these accompanying drawings without creative efforts.

LIST OF REFERENCE NUMERALS

10—mirror part, 110—mirror surface, 120—housing, 121—connecting portion, 122—first sub-groove, 123—second sub-groove, 124—first connecting element, 125—second connecting element, 126—reinforcing portion, 20—connecting rod, 210—first connecting rod, 211—connecting end, 212—rod body, 213—connecting end, 214—necked portion, 215—lug boss, 216—nick, 217—nut, 220—second connecting rod, 221—first rod body connecting portion, 222—second rod body connecting portion, 223—pivot, 230—third connecting rod, 232—third rod body connecting portion, 2321—curved portion, 2322—spherical portion, 233—fourth rod body connecting portion, 2331—screw portion, 2332—nut portion, 2333—housing connecting portion, 2334—cavity, 2335—nick, 2336—coupling portion, 2337—first sub-coupling portion, 2338—second sub-coupling portion, 30—base, 301—holding portion, and 302—mounting hole.

DETAILED DESCRIPTION OF THE EMBODIMENTS

The technical solutions in embodiments of the present disclosure will be described below clearly and completely with reference to the accompanying drawings in the embodiments of the present disclosure. Apparently, the described embodiments are merely a part, rather than all of the embodiments of the present disclosure. All other embodiments derived from the embodiments in the present disclosure by those of ordinary skill in the art without creative efforts shall fall within the protection scope of the present disclosure.

Figure 1:
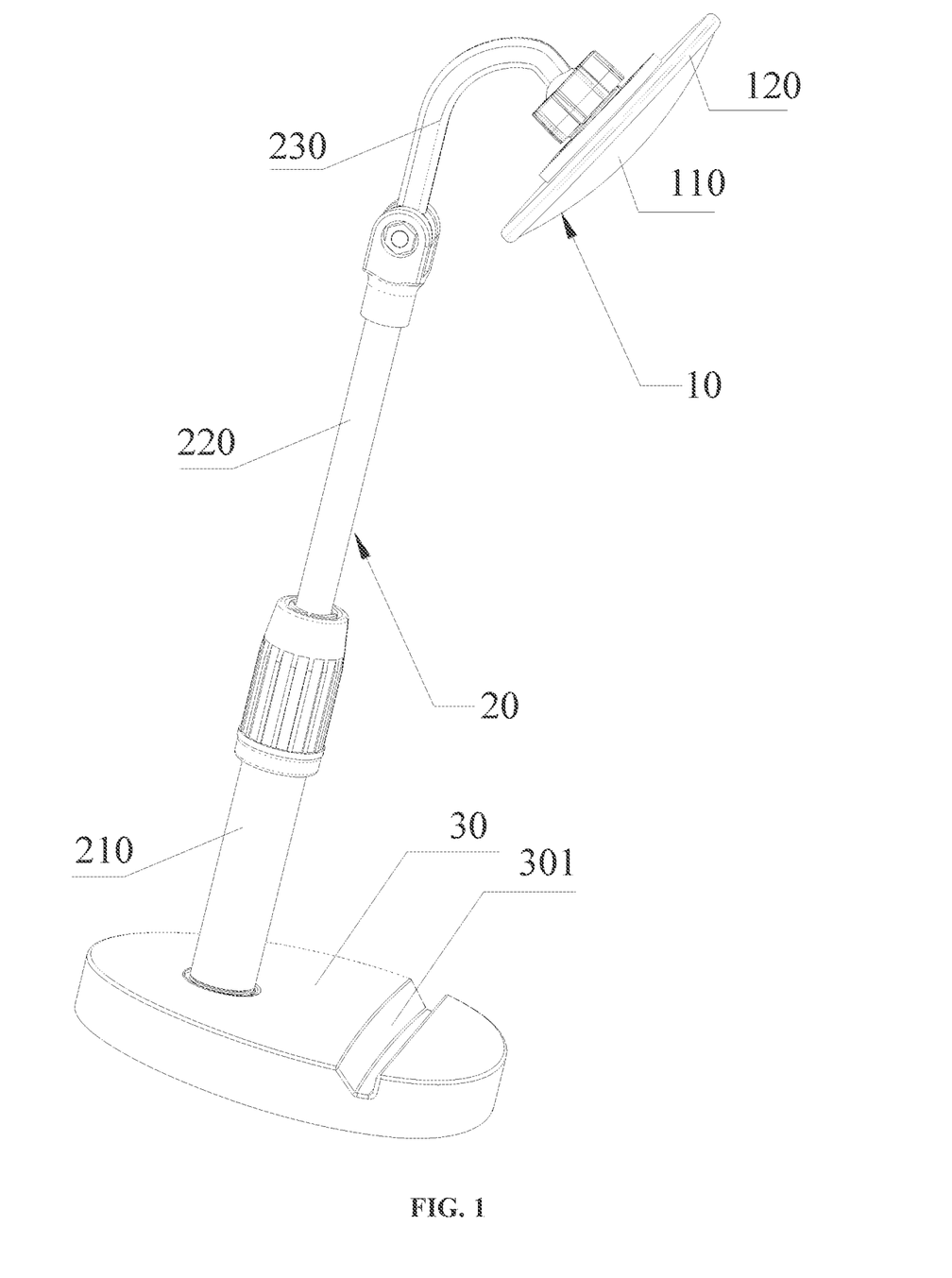
FIG. 1 is a structure diagram of a multi-functional mirror according to the present disclosure.

As shown in FIG. 1, the present disclosure provides a multi-functional mirror, including: a mirror part 10 including a mirror surface 110 and a housing 120 for fixing the mirror surface 110; a connecting rod 20 detachably connected to the housing 120 and used to support the mirror part 10; and a base 30 detachably connected to the connecting rod 20 and used to fix and support the connecting rod 20. The base 30 has a holding portion 301 for holding a smart terminal.

In the present disclosure, the mirror part may be various mirrors such as a plane mirror, a curved mirror, a concave mirror and a convex mirror. The shape of the mirror may also be selected according to actual requirements, such as square, round, triangle, rhombus or other irregular shapes. The multi-functional mirror in the present disclosure may be used for various purposes, such as used as a cosmetic mirror and a rear view mirror. Since the mirror part is detachably connected to the connecting rod, the mirror part may be replaced with various types of mirrors. Thus, the replaceability of this part is enhanced.

In the present disclosure, the multi-functional mirror can be used for holding various smart terminals such as a smart phone and a table computer.

In the present disclosure, various parts of the multifunctional mirror are all detachably connected to one another. Thus, the detachability of the product is improved, and the product is convenient to carry, store and transport.

Figure 2:
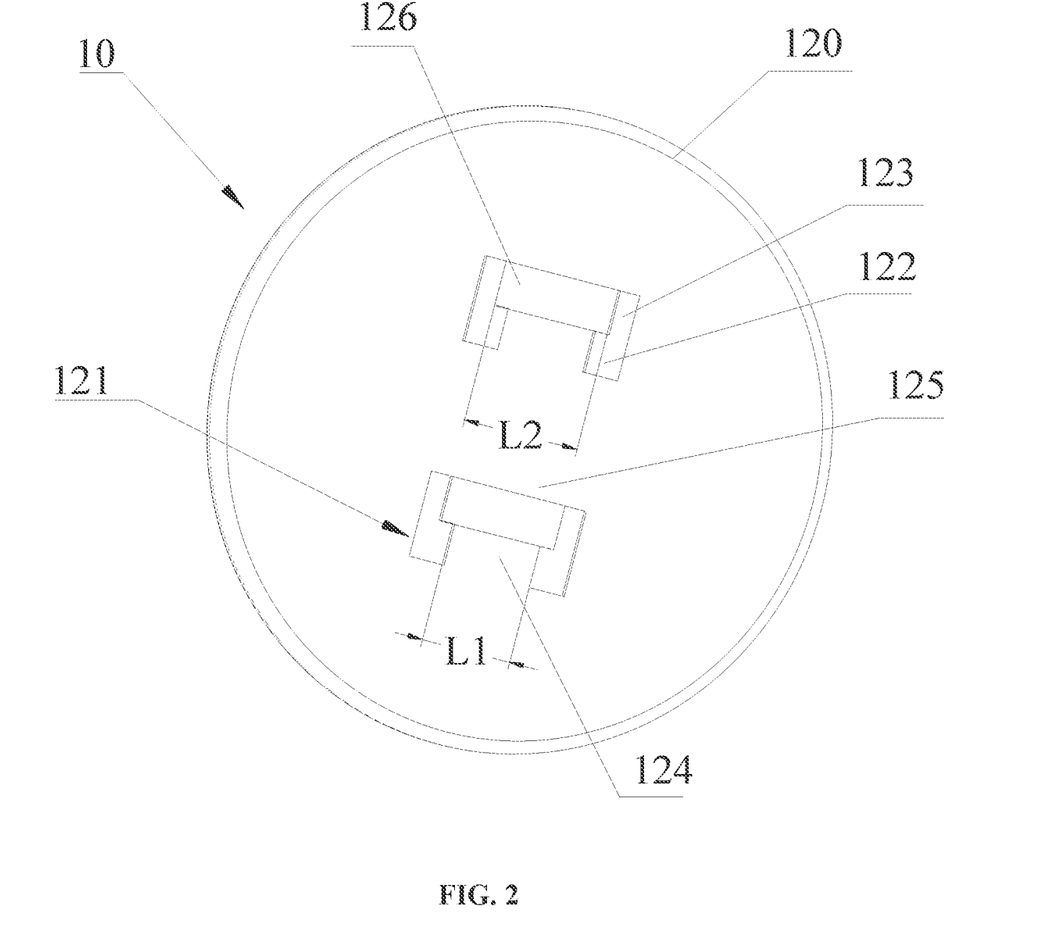
FIG. 2 is a structure diagram of a mirror part according to the present disclosure.

Further, as shown in FIG. 2, a connecting portion 121 is disposed on the housing 120 and used for connection with the connecting rod 20. In one preferred embodiment, the connecting portion 121 is grooves that are formed in the housing 120 in pair. As shown in FIG. 2, two pairs of grooves are disposed on the housing 120.

Each groove includes a first sub-groove 122 and a second sub-groove 123 that are communicated with each other. Each pair of first sub-grooves 122 is joined by a first connecting element 124, and each pair of second sub-grooves 123 is joined by a second connecting element 125. The length L1 of the first connecting element 124 is less than the length L2 of the second connecting element 125. In this embodiment, the lengths of the first and second connecting elements 124 and 125 refer to dimensions in a direction from the first sub-groove 122 to the second sub-groove 123.

Further, the second connecting element 125 also has a reinforcing portion 126 for enhancing the strength of the second connecting element 125. In one embodiment, the reinforcing portion 126 is a protrusion extending from the second connecting element 125, such that the thickness of the second connecting element 125 is increased. The increase of the thickness enhances the strength of the second connecting element 125.

Figure 3:
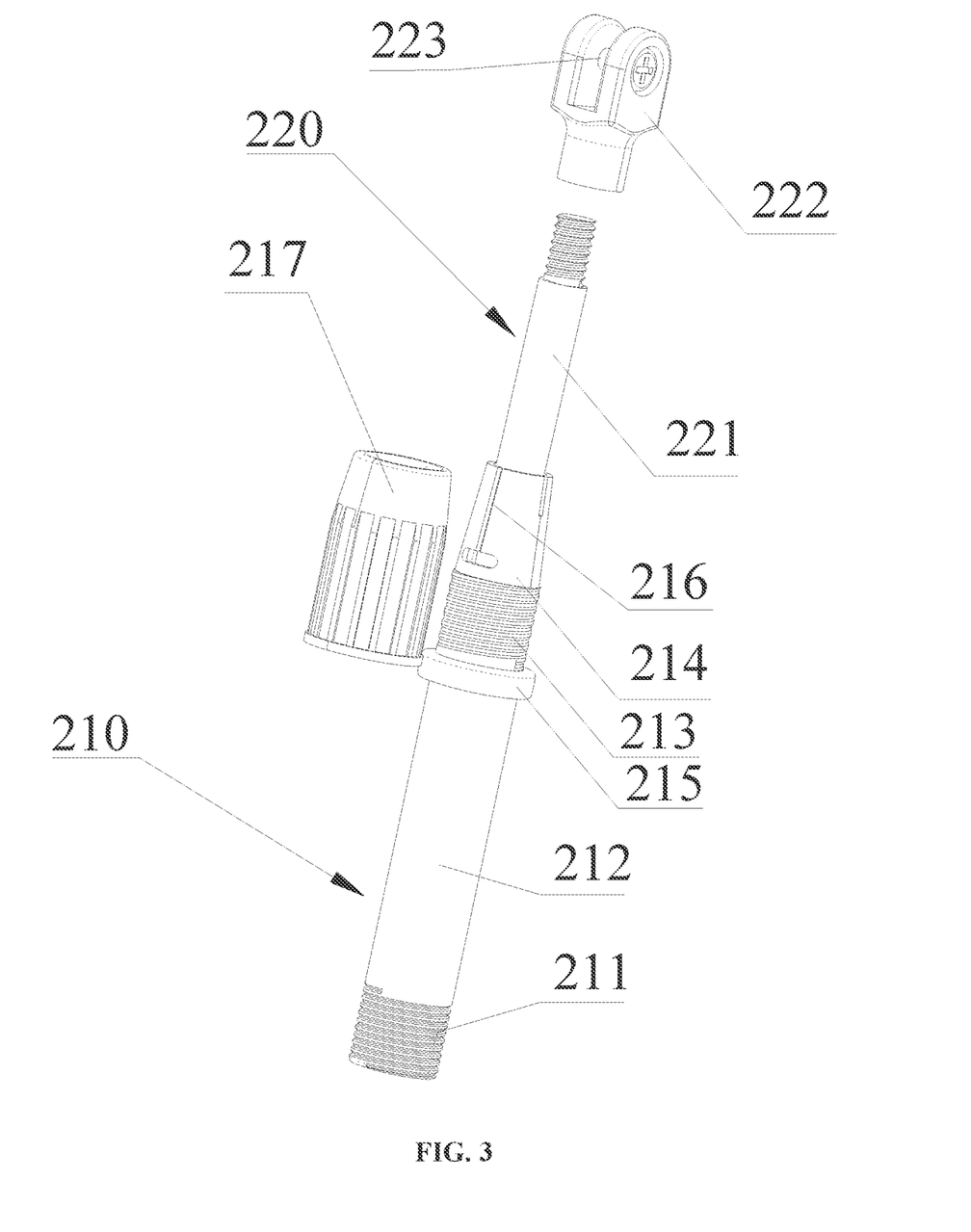
FIG. 3 is a structure diagram of first and second connecting rods according to the present disclosure.

Further, as shown in FIG. 3, the connecting rod 20 includes a first connecting rod 210, a second connecting rod 220, and a third connecting rod 230. The first connecting rod 210 is telescopically connected to the second connecting rod 220, and the second connecting rod 220 is rotatably connected to the third connecting rod 230. In one embodiment, the second connecting rod 220 is nested in the first connecting rod 210. The first connecting rod 210 includes two connecting ends 211 and 213, a rod body 212, and a necked portion 214. The connecting end 211, the rod body 212, the connecting end 213, and the necked portion 214 are integrally formed in sequence. The connecting end 211 has external thread for threaded connection with the base 211. The connecting end 213 has external thread for threaded connection with a nut 217. The necked portion 214 is gradually necked in a direction from the first connecting rod 210 to the third connecting rod 230. At least one nick 216 is formed in the necked portion 214, such that when the nut 217 is coupled with the connecting end 213, the diameter of the necked portion 214 is reduced such that the second connecting rod 220 is fixed in the first connecting rod 210. A lug boss 215 is further disposed below the connecting end 213 and used to abut against and limit the nut 217.

Figure 6:
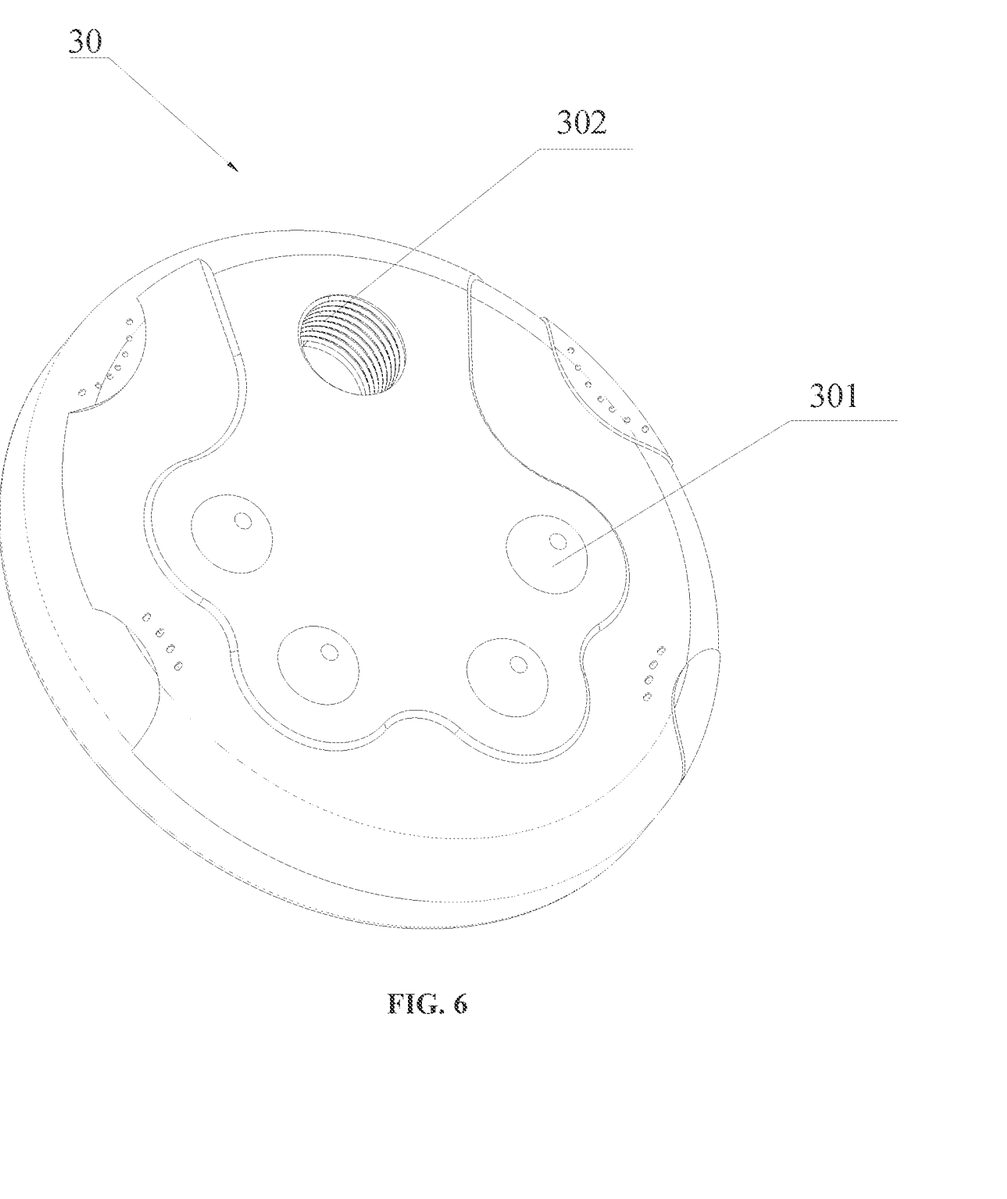
FIG. 6 is a structure diagram of a base according to the present disclosure.

As shown in FIG. 6, a mounting hole 302 is formed in the base 30. Internal thread is formed within the mounting hole 302. The external thread matching the internal thread is formed on the connecting end 211 of the first connecting rod 210. The first connecting rod 210 can be inserted into the mounting hole 302 and in threaded connection with the base 30.

Figure 4:
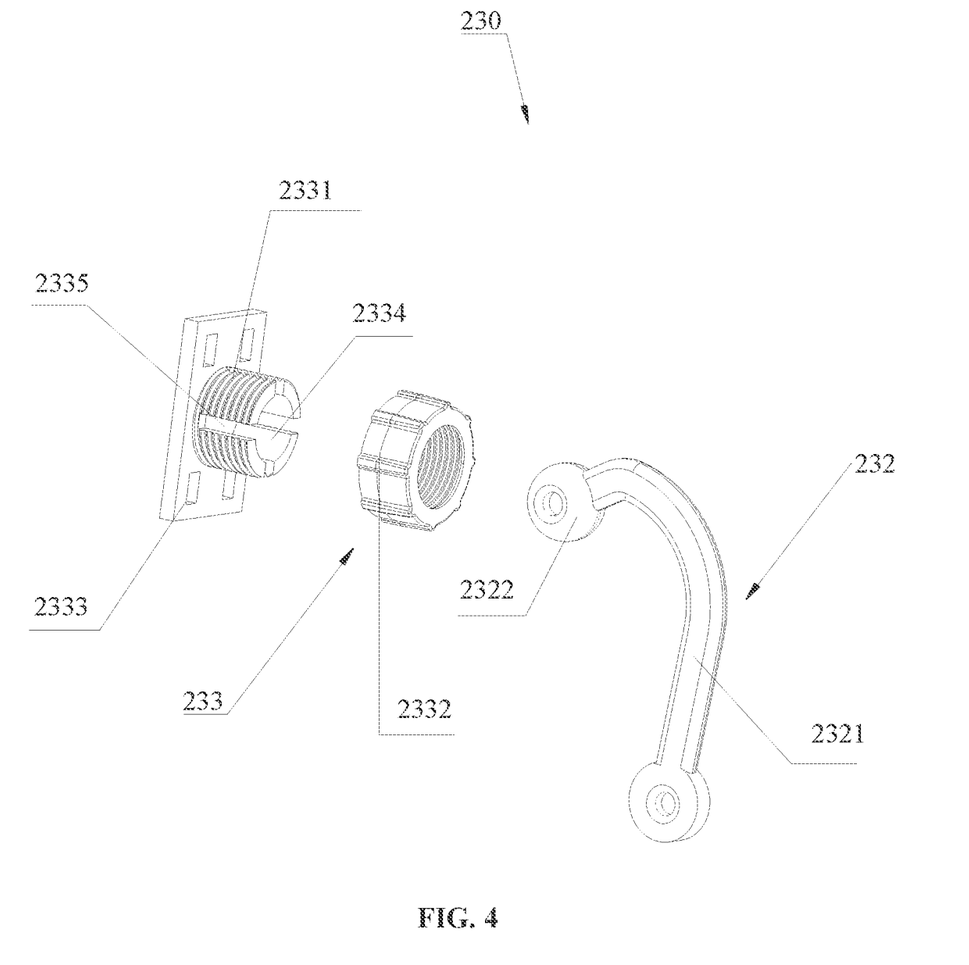
FIG. 4 is a structure diagram of a third connecting rod according to the present disclosure.

Further, as shown in FIG. 4, the third connecting rod 230 is connected to one end of the second connecting rod 220 through a pivot 223, and the third connecting rod 230 is capable of rotating around the pivot 223. In one embodiment, the pivot 223 is a screw. A straight slot and a through hole are formed in one end of the second connecting rod 220. A through hole is formed in one end of the third connecting rod 230, and this end is accommodated in the straight slot. The screw passes through the through holes of the second connecting rod 220 and the third connecting rod 230 such that the third connecting rod 230 is fixed in the straight slot in such a manner of being capable of rotating in the straight slot.

As shown in FIG. 3, the connecting rod 220 includes a first rod body connecting portion 221 and a second rod body connecting portion 222. The first rod body connecting portion 221 is in threaded connection with the second rod body connecting portion 222. The first rod body connecting portion 221 is telescopically connected to the first connecting rod 210. The second rod body connecting portion 222 is rotatably connected to the third connecting rod 230. Since the second connecting rod 220 is designed as being composed of two detachable portions, the detachability of the third connecting rod 230 is increased, thus facilitating storage and carrying.

Further, as shown in FIG. 4, the third connecting rod 230 includes a third rod body connecting portion 232 and a fourth rod body connecting portion 233. Further, the third rod body connecting portion 232 is detachably connected to the fourth rod body connecting portion 233. The third rod body connecting portion 232 is connected to the second connecting rod 220, and the fourth rod body connecting portion 233 is connected to the housing 120.

Specifically, the third rod body connecting portion 232 includes a curved portion 2321 and a spherical portion 2322. The curved portion 2321 and the spherical portion 2322 are integrally molded. The curved portion 2321 is rotatably connected to the second connecting rod 220, and the spherical portion 2322 is detachably connected to the fourth rod body connecting portion 233. The curved portion 2321 is so designed that the connecting rod can be avoided from having edges and corners and more accord with the human body engineering. With the spherical portion 2322, a larger rotation angle of the mirror part 10 can be ensured to enable 360-degree rotation.

Figure 5:
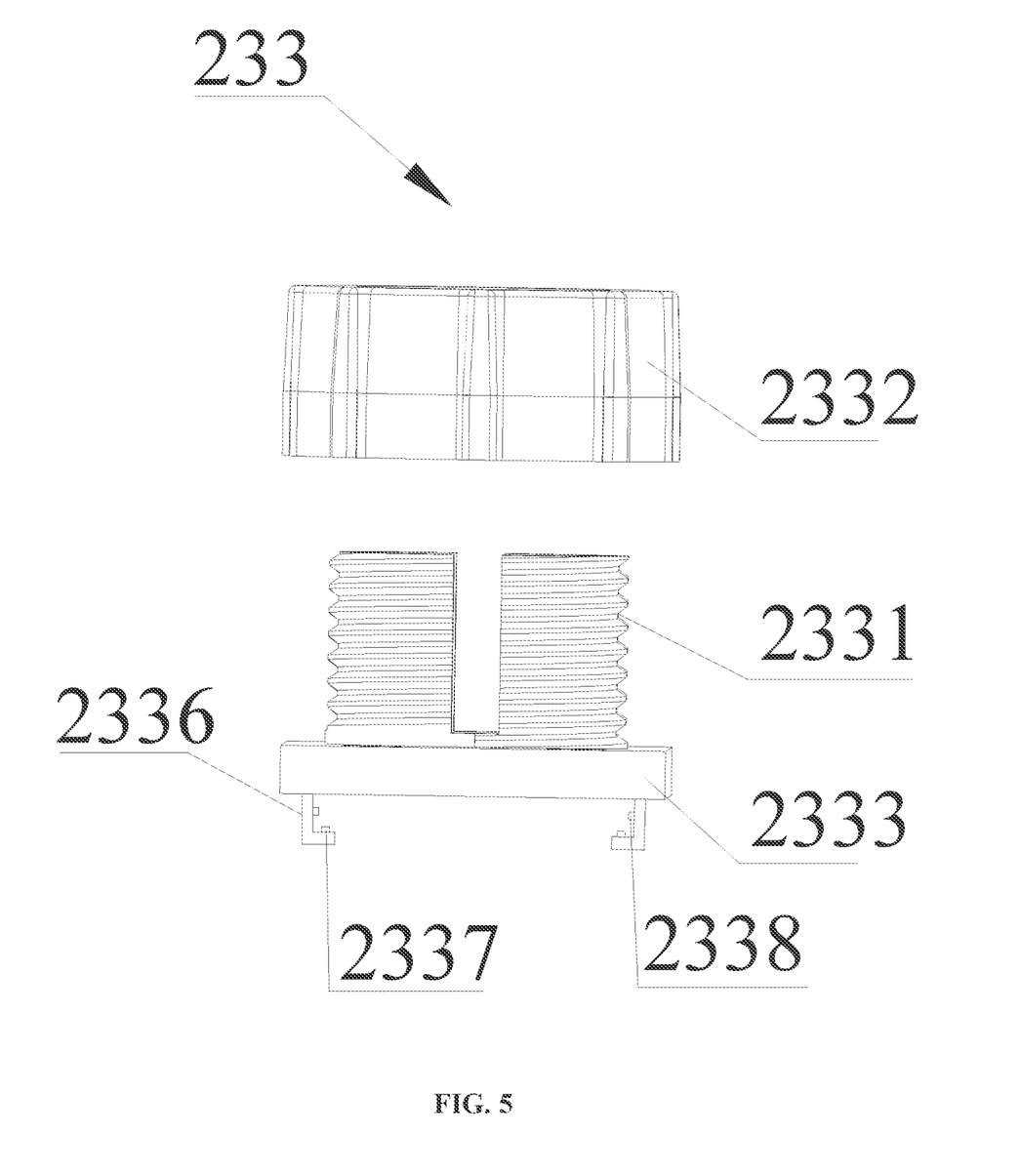
FIG. 5 is a structure diagram of a fourth rod body connecting portion according to the present disclosure.

Further, as shown in FIG. 5, the fourth rod body connecting portion 233 includes a screw portion 2331, a nut portion 2332, and a housing connecting portion 2333. The housing connecting portion 2333 is integrally molded with the screw portion 2331. The screw portion 2331 has a cavity 2334 which is used for accommodating the spherical portion 2322. The nut portion 2332 is in threaded connection with the screw portion 2331, such that the spherical portion 2322 is rotatably fixed in the nut portion 2332.

In one preferred embodiment, at least one nick is formed in the screw portion 2331 such that the volume of the cavity 2334 can be increased or reduced. There may be 1, 2, 3, 4 or more nicks, which is not limited herein. With the nick, the volume of the cavity 2334 may not be restricted. Thus, when the spherical portion 2322 is inserted into the cavity 2334, the cavity is appropriately increased to facilitate insertion. When the nut portion is coupled to the screw portion, the cavity is appropriately reduced to prevent detachment of the spherical portion.

Further, as shown in FIG. 4 and FIG. 5, the housing connecting portion 2333 is provided with coupling portions 2336 in pair for coupling with the housing 120. Preferably, each coupling portion is L-shaped, and a first sub-coupling portion 2337 and a second sub-coupling portion 2338 are disposed on two arms of the L-shaped coupling portion, respectively, and used to form interference fit with the housing 120 to enhance the coupling strength. The first and second sub-coupling portions 2337 and 2338 may be protrusions disposed on the two arms of the L-shaped coupling portion.

Further, as shown in FIG. 2 and FIG. 5, in one embodiment, the connecting portion 121 includes 4 grooves arranged into upper and lower pairs. The coupling portion 2336 may be placed into the first sub-groove 123, and then the fourth rod body connecting portion 233 is forcibly pushed toward the second sub-groove 122, such that the coupling portion 2336 will enter the second sub-groove 122 and form interference fit with the second connecting element 125, thereby fixing the fourth rod body connecting portion 233 to the housing 120.

With the first and second sub-coupling portions 2337 and 2338, the strength of the interference fit can be enhanced, such that the degree of stability of the connection between the mirror part 10 and the connecting rod 20 is increased.

As shown in FIG. 1 and FIG. 6, the holding portion 301 may be a recess formed in the base 30 and may also be a plurality of protrusions formed on the base 30. The specific structure may be selected and adjusted according to actual requirements, which is not limited herein.

In the present disclosure, the overall height of the multi-functional mirror may be adjusted in a first direction by means of telescoping of the second connecting rod. The rotatable connection of the third connecting rod and the second connecting rod enables adjustment of the height of the multi-functional mirror and a distance to a user in a second direction. The rotatable connection of the third connecting rod and the mirror part enables adjustment of a view angle range of the multi-functional mirror in a third direction. The adjustments in the three directions basically may enable a 360-degree view angle range of the multi-functional mirror.

The foregoing disclosed is merely one preferred embodiment of the present disclosure, and certainly shall not be used to limit the scope of the claims of the present disclosure. A person of ordinary skill in the art can understand all or some of the procedures for implementing the foregoing embodiment and make equivalent changes according to the claims of the present disclosure. The equivalent changes still fall within the scope of the present disclosure.

What is claimed is:

1. A multi-functional mirror, comprising:
   a mirror part comprising a mirror surface and a housing for fixing the mirror surface;
   a connecting rod detachably connected to the housing and used to support the mirror part; and
   a base detachably connected to the connecting rod and used to fix and support the connecting rod, wherein the base has a holding portion for holding a smart terminal;
   wherein a connecting portion is disposed on the housing and used for connection with the connecting rod; the connecting portion is defined as grooves that are formed in the housing in pair; each groove comprises a first sub-groove and a second sub-groove that are communicated with each other; each pair of first sub-grooves is joined by a first connecting element, and each pair of second sub-grooves is joined by a second connecting element and a length of the first connecting element is less than a length of the second connecting element.

2. The multi-functional mirror according to claim 1, wherein the second connecting element further has a reinforcing portion for enhancing strength of the second connecting element.

3. A multi-functional mirror, comprising:
   a mirror part comprising a mirror surface and a housing for fixing the mirror surface;
   a connecting rod detachably connected to the housing and used to support the mirror part; and
   a base detachably connected to the connecting rod and used to fix and support the connecting rod, wherein the base has a holding portion for holding a smart terminal;
   wherein the connecting rod comprises a first connecting rod, a second connecting rod, and a third connecting rod; and the first connecting rod is telescopically connected to the second connecting rod, and the second connecting rod is rotatably connected to the third connecting rod;
   the third connecting rod is connected to one end of the second connecting rod through a pivot, and the third connecting rod is capable of rotating around the pivot.

4. A multi-functional mirror, comprising:
   a mirror part comprising a mirror surface and a housing for fixing the mirror surface;
   a connecting rod detachably connected to the housing and used to support the mirror part; and
   a base detachably connected to the connecting rod and used to fix and support the connecting rod, wherein the base has a holding portion for holding a smart terminal;
   wherein the connecting rod comprises a first connecting rod, a second connecting rod, and a third connecting rod; and the first connecting rod is telescopically connected to the second connecting rod, and the second connecting rod is rotatably connected to the third connecting rod;
   a mounting hole is formed in the base; an internal thread is formed within the mounting hole; an external thread matching the internal thread is formed on one end of the first connecting rod; and the first connecting rod is capable of being inserted into the mounting hole and in threaded connection with the base.

5. The multi-functional mirror according to claim 4, wherein the second connecting rod comprises a first rod body connecting portion and a second rod body connecting portion; the first rod body connecting portion is in threaded connection with the second rod body connecting portion; and the first rod body connecting portion is telescopically connected to the first connecting rod, while the second rod body connecting portion is rotatably connected to the third connecting rod.

6. The multi-functional mirror according to claim 4, wherein the third connecting rod comprises a third rod body connecting portion and a fourth rod body connecting portion; the third rod body connecting portion is detachably connected to the fourth rod body connecting portion; and the third rod body connecting portion is connected to the second connecting rod, and the fourth rod body connecting portion is connected to the housing.

7. The multi-functional mirror according to claim 6, wherein the third rod body connecting portion comprises a curved portion and a spherical portion; the curved portion and the spherical portion are integrally molded; and the curved portion is rotatably connected to the second connecting rod, and the spherical portion is detachably connected to the fourth rod body connecting portion.

8. The multi-functional mirror according to claim 7, wherein the fourth rod body connecting portion comprises a screw portion, a nut portion, and a housing connecting portion; the housing connecting portion and the screw portion are integrally molded; the screw portion has a cavity which is used for accommodating the spherical portion; and the nut portion is in threaded connection with the screw portion, such that the spherical portion is rotatably fixed in the nut portion.

9. The multi-functional mirror according to claim 8, wherein at least one nick is formed in the screw portion such that a volume of the cavity is capable of being increased or reduced.

10. The multi-functional mirror according to claim 8, wherein the housing connecting portion is provided with coupling portions in pair for coupling with the housing.

11. The multi-functional mirror according to claim 10, wherein each coupling portion is L-shaped, and a first sub-coupling portion and a second sub-coupling portion are disposed on two arms of the L-shaped coupling portion, respectively, and used to form interference fit with the housing to enhance coupling strength.

* * * * *